United States Patent [19]
De Schrijver

[11] Patent Number: 5,575,184
[45] Date of Patent: Nov. 19, 1996

[54] BICYCLE PEDAL WITH STRUCTURE FOR HOLDING A SHOE ON A FOOTREST PORTION THEREOF

[75] Inventor: Hubert De Schrijver, Waasmunster, Belgium

[73] Assignee: Eddy Merckx Equipments, naamloze vennootschap, Hamme, Belgium

[21] Appl. No.: 378,555

[22] Filed: Jan. 25, 1995

[30] Foreign Application Priority Data

Jan. 25, 1994 [BE] Belgium ................ 09400082

[51] Int. Cl.⁶ .................................................. G05G 1/14
[52] U.S. Cl. ............................................... 74/594.6
[58] Field of Search ........................ 74/594.6; 36/131

[56] References Cited

U.S. PATENT DOCUMENTS

| 620,291 | 2/1899 | Erickson | 74/594.6 |
| 4,899,618 | 2/1990 | Christol. | |
| 5,199,324 | 4/1993 | Sain | 74/594.6 X |

FOREIGN PATENT DOCUMENTS

| 2623464 | 5/1989 | France | 74/594.6 |
| A3638155 | 5/1987 | Germany. | |
| 3602329 | 7/1987 | Germany | 74/594.6 |
| 3828716 | 3/1989 | Germany | 74/594.6 |
| 3831040 | 3/1989 | Germany | 74/594.6 |
| 2266687 | 11/1993 | United Kingdom | 74/594.6 |
| A8906619 | 7/1989 | WIPO. | |

Primary Examiner—Charles A. Marmor
Assistant Examiner—Mary Ann Battista
Attorney, Agent, or Firm—Bacon & Thomas

[57] ABSTRACT

A bicycle pedal includes a foot rest (2), connected to a pedal axle (3), which is provided with an assembly (4) that functions to hold a shoe (47) on the bicycle pedal (1). The assembly (4) can be opened by a lateral movement of the shoe (47). The assembly (4) includes at least two clamps (5, 6) located respectively on opposite sides of the bicycle pedal. Each of the clamps (5, 6), upon exerting a force, can be pivoted laterally outward relative to the center of the bicycle pedal (1).

17 Claims, 4 Drawing Sheets

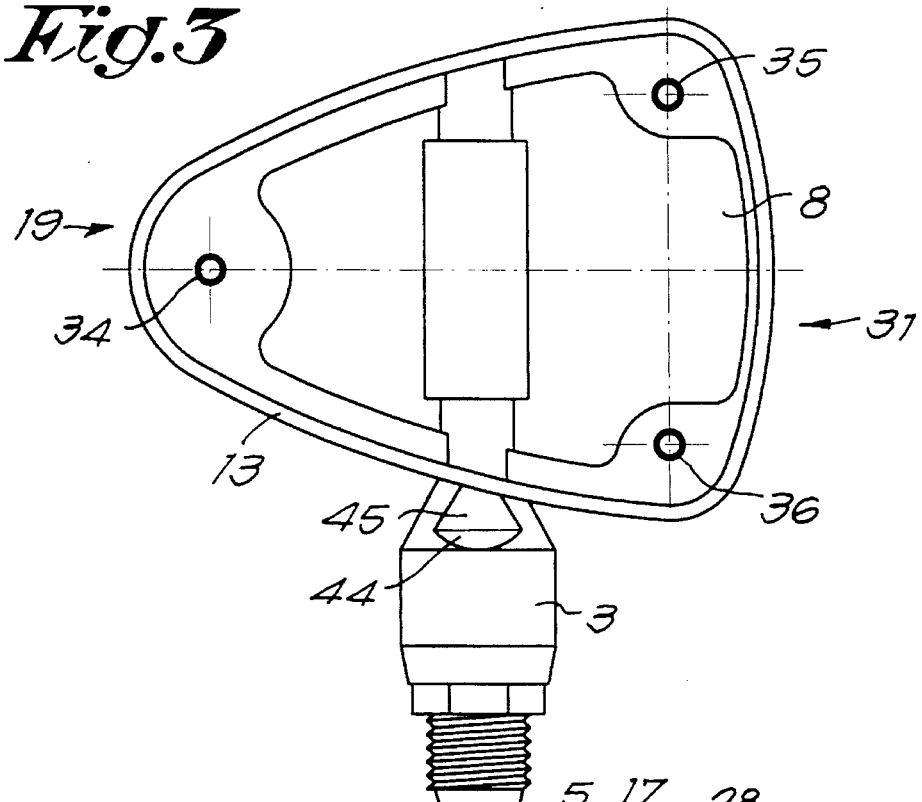
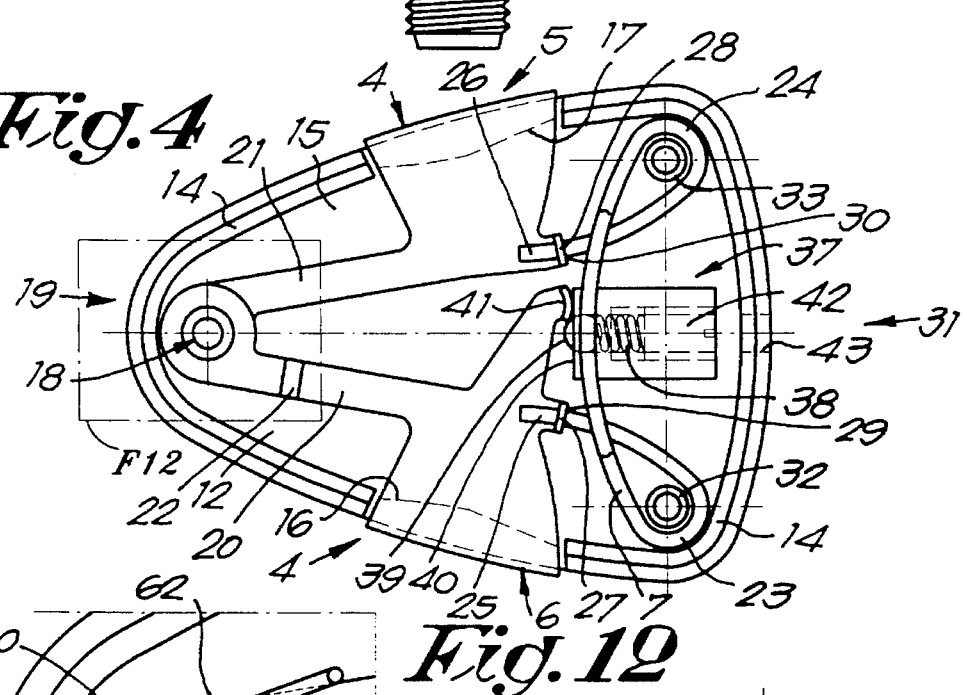
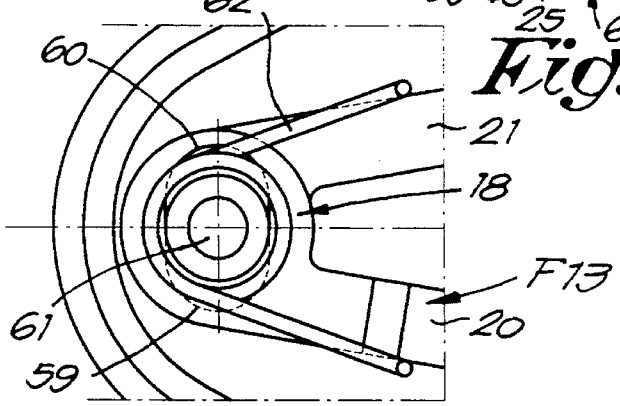
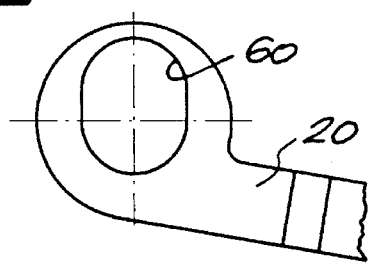

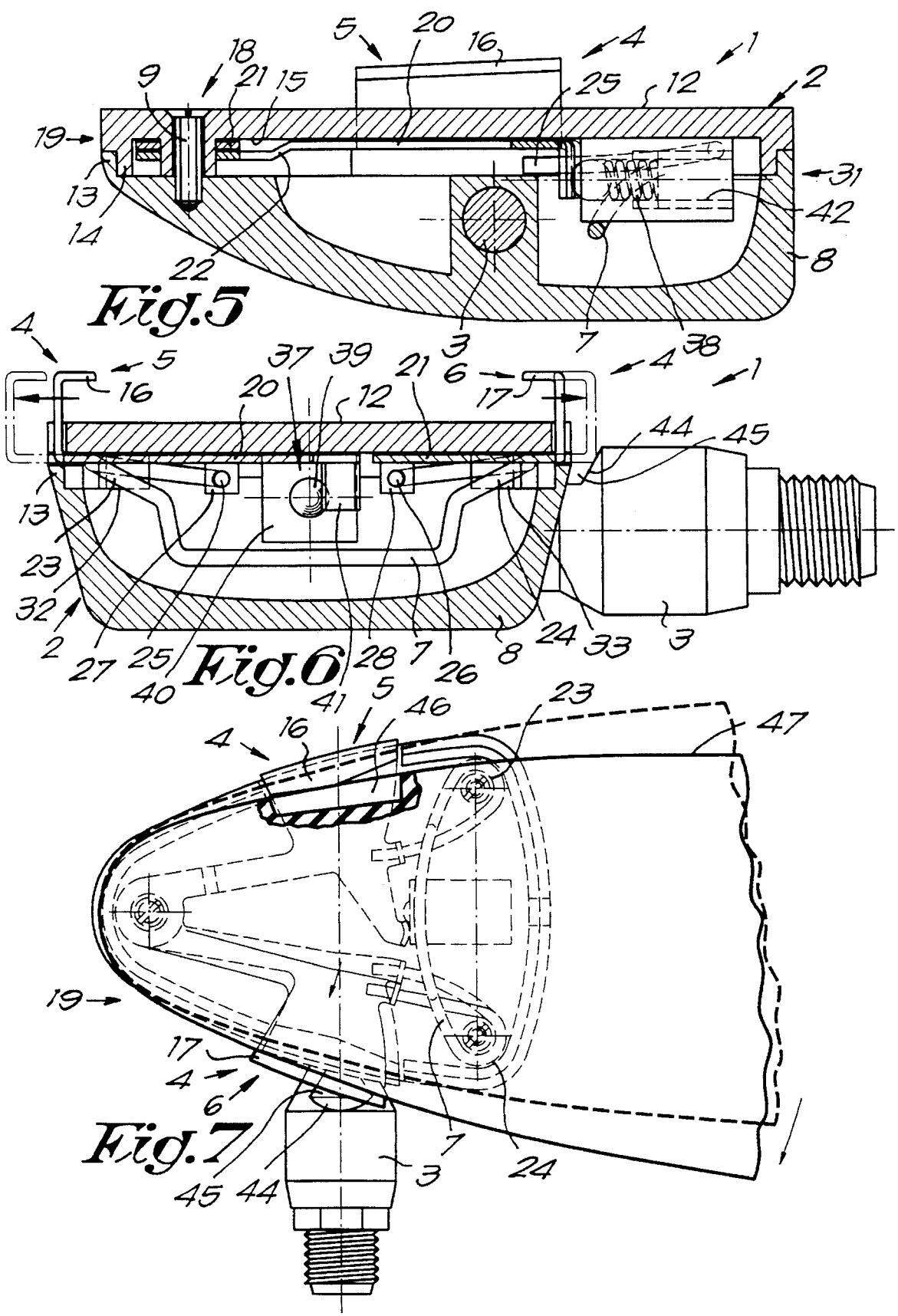

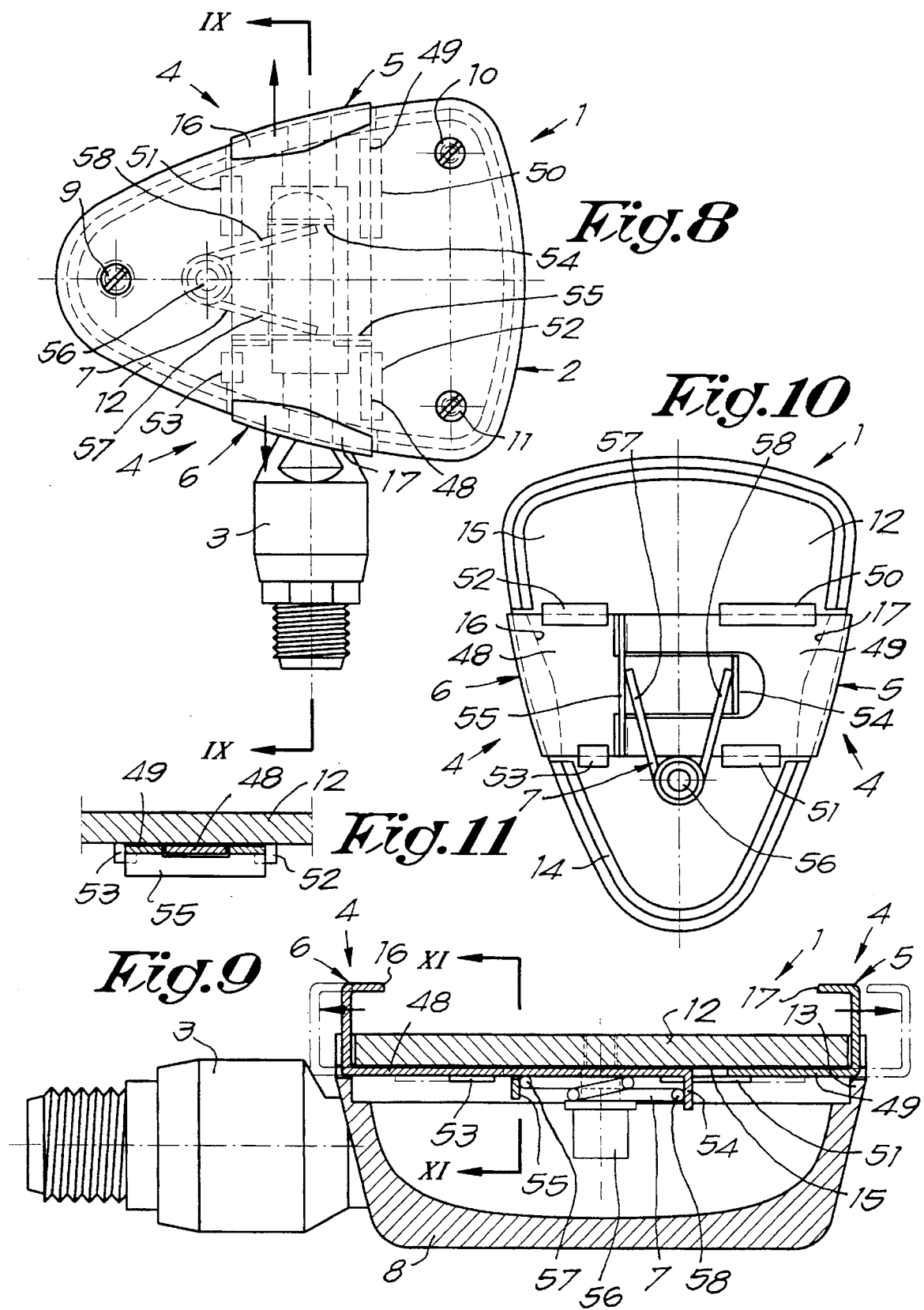

BICYCLE PEDAL WITH STRUCTURE FOR HOLDING A SHOE ON A FOOTREST PORTION THEREOF

BACKGROUND OF THE INVENTION

1. Field of the Invention

The invention relates to a bicycle pedal and, more particulary, a bicycle pedal for race bicycles and such of the type whereby the foot rest is provided with means that allow the holding of a shoe on the bicycle pedal, whereby these means can be opened by means of a lateral movement, so that the shoe will be freed from the pedal.

2. Discussion of the Prior Art

A lot of bicycle pedals for racing bicycles are already known, whereby the shoe of the bicycle racer is uncoupled from the bicycle pedal by turning it outside, in other words, by turning the heel of the shoe away from the bicycle.

Such a bicycle pedal shows as a disadvantage that, if both feet of a bicycle racer must be uncoupled at the same time, the feet must be turned in an unnatural manner. The bicycle racer must, however, always turn his feet away from each other.

When experiencing a fall, a bicycle racer most of the time does not have the reflex reaction to perform such an unnatural movement, as a result of which the bicycle racer is not of at least not with both feet uncoupled from the bicycle pedals. Thus, his risk of getting seriously wounded is large.

SUMMARY OF THE INVENTION

Thus, the present invention aims at a bicycle pedal, more special a bicycle pedal for racing bicycles and similar, which completely excludes the said disadvantage and other disadvantages of known bicycle pedals, in other words, whereby a bicycle racer in an emergency situation, as for example in a fall, is uncoupled with both feet from the respective bicycle pedals by a normal reflex reaction, in that both feet are turned according to the same turning sense. Hereto, a bicycle pedal according to the invention essentially consists of a foot rest, connected to a pedal axle, which is provided with means that allow to hold a shoe on the bicycle pedal, whereby these means can be opened by means of a lateral movement, whereby the said means consist of at least two clamps, located respectively on opposite sides on the bicycle pedal, which both, as a force is exerted on them, can be pivoted from the center of the bicycle pedal concerned into outward direction.

The said clamps are hereby preferably held closed by means of elastic means.

It is clear that this offers the advantage that a cyclist, for example a racer, can be released from the pedals as well by a movement of the feet to the left hand side as well as to the right hand side.

BRIEF DESCRIPTION OF THE DRAWINGS

With the aim of better showing the characteristics of the invention, in the following a preferred embodiment is described, as an example without any limiting character, with reference to the enclosed drawings, wherein:

FIGS. 3 and 4 show cross-sections respectively according to the lines III—III and IV—IV in FIG. 2;

FIG. 5 and 6, on a larger scale, show cross-sections according to the lines V—V and VI—VI in FIG. 1;

FIG. 7 shows the usage of the bicycle pedal according to the FIGS. 1 to 6;

FIG. 8 shows a view similarly to that of FIG. 1, but for an embodiment variant;

FIG. 9, on a larger scale, shows a cross-section according to line IX—IX in FIG. 8;

FIG. 10 shows a view similarly to that of FIG. 4, but for an emdodiment according to FIGS. 8 and 9;

FIG. 11 shows a cross-section according to line XI—XI in FIG. 9;

FIG. 12, on a larger scale, shows a variant of the part which in FIG. 4 is marked by F12;

FIG. 13 shows the part which is marked by the arrow F13 in FIG. 12.

DETAILED DESCRIPTION OF THE PREFERRED EMBODIMENTS

Figure 1:
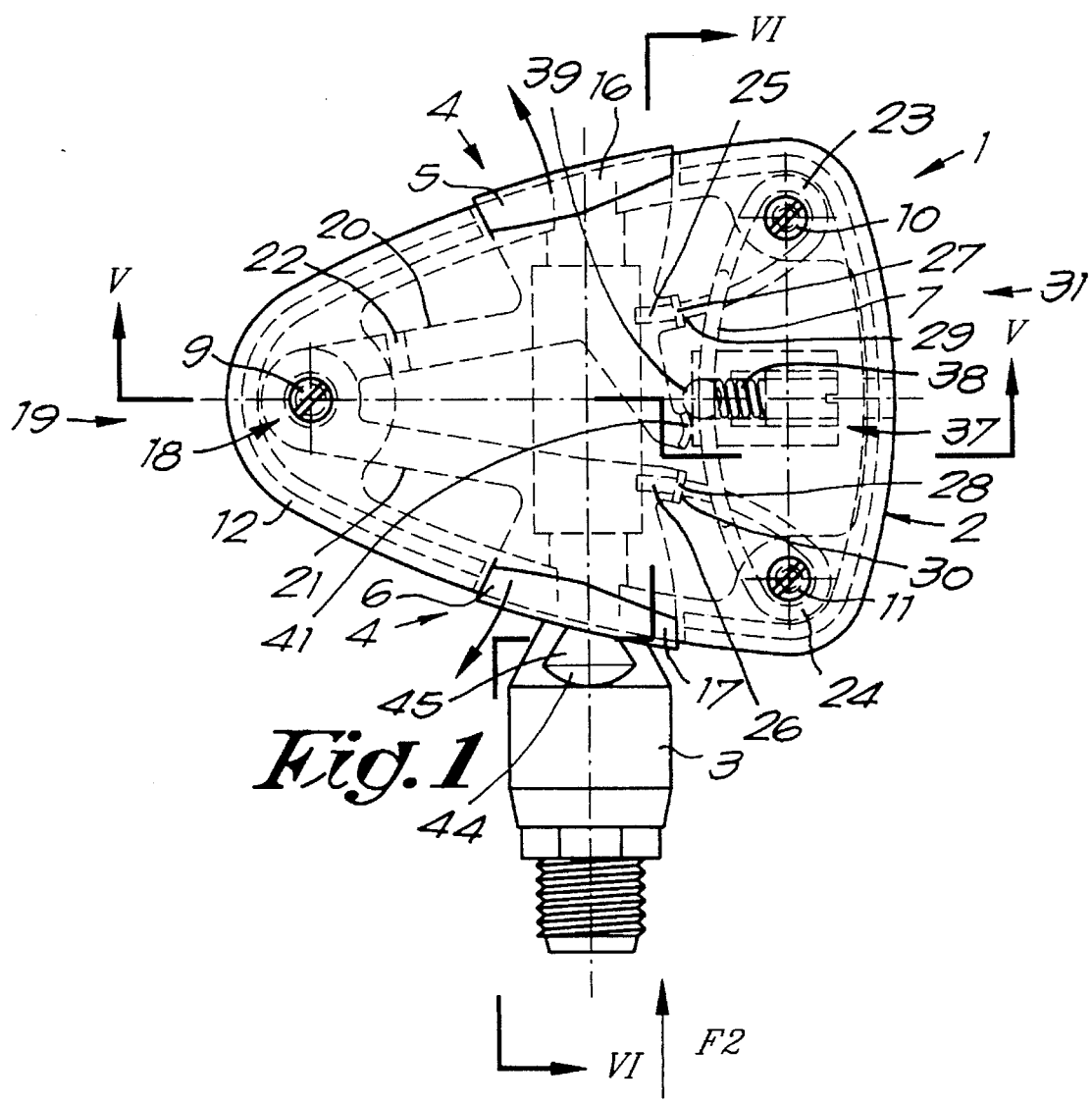
FIG. 1 in top view shows a bicycle pedal according to the invention.
Figure 2:
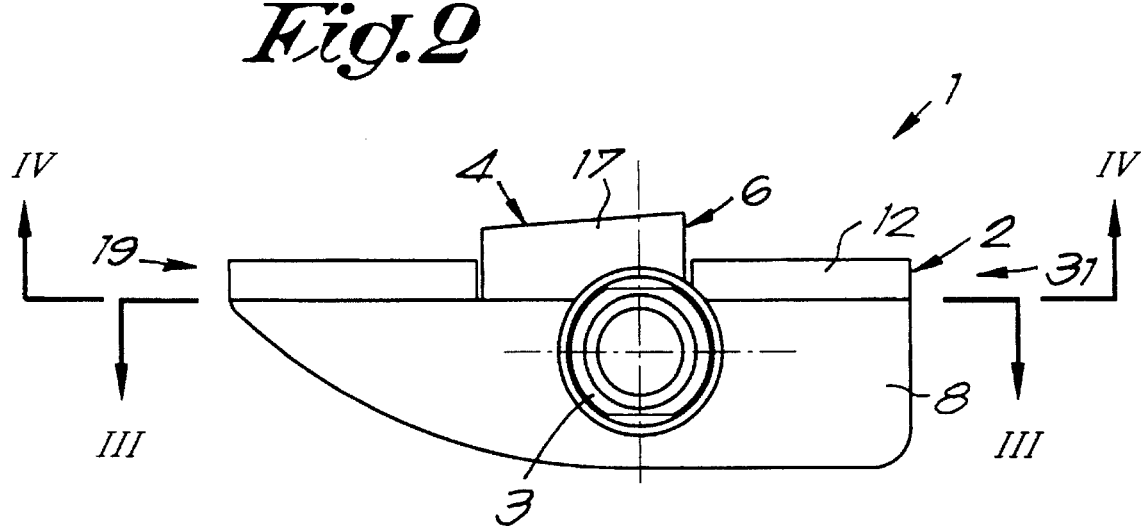
FIG. 2 shows a view according to arrow F2 in FIG. 1.

As shown in the FIGS. 1 to 6, a bicycle pedal 1 according to the invention essentially consists of a foot rest 2 which is connected to a pedal axle 3 which, at its upper side, is provided with means 4 allowing to hold a shoe at the bicycle pedal 1, whereby said means consist of at least two clamps 5 and 6 which are located laterally on opposite sides of the bicycle pedal 1 and which can both, under the influence of elastic means 7, be moved from the center of the bicycle pedal 1 in outward direction.

The foot rest 2 preferably consists of a base 8 which is mounted on the pedal axle 3 and a triangular, rounded support plate 12 which is fixed on this base 8, for example by means of screws 9, 10 and 11.

As visible in FIGS. 3, 4 and 5, the base 8 and the support plate 12 match precisely one on top of the other by means of profiled edges, respectively 13 and 14, matching into each other.

The said means 4, with exception of the actual clamps 5 and 6, are preferably mounted against the lower side 15 of the support plate 12 and are being screened by means of the base 8, to which aim this latter is manufactured in form of a covering cap.

Said clamps 5 and 6 which are put up laterally on opposite sides of the bicycle pedal 1 in an open V-shape, consist of hook-shaped elements which extend over the lateral edge of the support plate 12 in such a way that, at the lower side 15 of the support plate 12, they can cooperate with the elastic means 7, while, at the upper side, they are provided with lips 16 and 17 which, as described in the following, can grip behind a shoe.

Preferably, the clamps 5 and 6 are turnable.

Hereby, use can be nade of a common hinge point 18, on one hand in order to limit the weight, and on the other hand in order to provide a simple constructive unit.

This hinge point 18 is preferably provided at the front side 19 of the bicycle pedal 1. In the shown example, the clamps 5 and 6 hereto are connected to the hinge point 18 by means of hinge arms 20 and 21. Hereby, the hinge arm 20 is provided with a deformation 22, as a result of which the clamps 5 and 6 are located in the same horizontal plane.

As shown in FIGS. 1 and 4 to 6, the said elastic means 7 which force the clamps 5 and 6 to the center of the bicycle pedal 1, consist of a wire spring which preferably, by means of two loops 23 and 24, is biased with its ends 25 and 26 between the clamps 5 and 6, and thus exerts a constant force upon this latter.

More special, the ends 25 and 26 of the wire spring are connected to the clamps 5 and 6 in that each hinge arm 20 and 21 at its free hinging end comprises a bent lip, respectively 27 and 28, with a passage, respectively 29 and 30, through which the respective end 25–26 of the wire spring is attached.

Preferably and as shown in the FIGS. 1 and 4, at the back side 31 of the support plate 12, next to the corners, two supports 32 and 33 are provided around which the wire spring with the said loops 23 and 24 is installed.

The hinge point 18 and/or the supports 32—33 are preferably manufactured in such a way that they also serve as attachment points for the support plate 12. In the shown example, they consist to this end of sleeves, manufactured in one piece with the base 8, which form passages for the screws 9, 10 and 11, in such a way that these latter can be screwed into corresponding thread openings 34, 35 and 36 in the base 8.

It is clear that instead of one common spring, two separate springs might be used, too.

As shown in the FIGS. 1 and 4 to 6, the bicycle pedal 1 preferably is also provided with a resistive mechanism 37 which cooperates with at least one of the clamps, preferably the clamp 5 which is located at the side opposite to the pedal axle, and which mechanism 37 provides for that initially a predetermined supplemental force has to be surmounted in order to bring the clamp 5 concerned out of its clamping position.

This resistive mechanism 37 in this case essentially consists of an element 39 which, directly or indirectly, by means of the clamp 5 concerned, can be pushed away against the force of a spring 38. As shown, a ball-shaped element can be used which, by means of a helicoidal spring, is pressed into a seat 40, such, that the ball comes into the part of a turned-down part 41 of the clamp 5. Thus, when moving the clamp 5, initially a well-defined force must be surmounted in order to bring the clamp 5 with the part 41 over the ball.

Hereby, the resistance of the resistive mechanism 37 may be adjusted by means of an adjustment screw 42 which adjusts the tension force of the spring 38. The adjustment screw 42 is accessible through an opening 43. It is obvious that the adjustment can be performed in other ways, too.

In another embodiment which is not shown in the figures, both clamps 5–6 shall be provided with such a resistive mechanism.

Further, the shown bicycle pedal 1 is provided with a stop 44 which limits the movement of the clamp 6 at the side of the pedal axle 3. This may consist of the edge of a recess 45 in the pedal axle 3.

The usage and function of a bicycle pedal according to the invention is described in the following referring to FIG. 7.

Under the influence of the elastic means 7, the clamps 5 and 6 are permanently pressed towards each other.

When a racer attaches a foot upon a bicycle pedal 1 according to the invention, he glides with his foot over the pedal, from the back towards the front. Hereby, the clamps 5 and 6 grip into slots 46 or similar which are specially provided to this purpose at the shoe 47 concerned.

When the racer falls, by the shock or a reflex reaction of the racer the feet usually will perform the same lateral movement.

By this, as shown in FIG. 7, the shoe 47 can be released. Because, according to the invention, both clamps 5 and 6 of each of both bicycle pedals 1 are movable, the feet shall always be released with every lateral movement of the feet, whatever the direction. As a result, in a fall serious injuries can be prevented.

The stops 44 prevent the racer from getting his heels between the spokes of the bicycle.

The resistive mechanism essentially is useful during dismounting. Hereby, it is desirable that initially a determined force must be surmounted before the outmost clamp 5 can be opened. The adjustment of the force is performed according to the racer's wishes.

In the FIGS. 8 to 10, an embodiment variant of the bicycle pedal according to the FIGS. 1 to 7 is shown, whereby this embodiment variant differs from the first embodiment in that the relative movement of the said clamps 5 and 6 is parallel, where this relative movement in the embodiment according to the FIGS. 1 to 7 is performed in a curve.

In this embodiment variant, the clamps 5 and 6 are connected to arms 48–49 which are located against the lower side 15 of the support plate 12 and are being held against this lower side by means of guides 50–51 and 52–53.

The support arm 48 is in fact manufactured in T-shape and shows at its free end a downward directed edge 54, while the arm 49 in fact is manufactured in U-shape, whereby the edge 54 of the arm 48 matches into the U of the arm 49 and whereby the free ends of the arms of the said U-shaped arm 49 consist of a downward directed bridge 55 connecting the said arms to each other.

In this case the elastic means 7 are attached around an axle 56 which is fixed in the plate 12, the free arms 57–58 of which act, on one hand, upon the edge 54 of the arm 48 and, on the other hand, upon the bridge 55 of the arm 49.

In this embodiment, the clamps 5 and 6 are being pushed parallel towards each other by means of the elastic means 7, whereby, when the foot, more specially the shoe, is turned in the pedal, depending on the turning sense of the shoe, the clamp 5 or 6 is pushed away in order to release the shoe from the pedal.

In this embodiment, too, a resistive mechanism 37 can be provided which, however, for the sake of simplicity, is not shown in the drawings.

The said stop 44 can also be provided in this embodiment variant.

With a parallel movement of the clamps 5 and 6, the attachment of a shoe 47 between these clamps can be performed easier than in an embodiment with hinging clamps. In order to achieve that the shoe 47 can be attached easily when using turnable or hinging clamps 5 and 6, the clamps 5 and 6 can be fixed with some play in the hinge point 18.

As shown in the FIGS. 12 and 13, the hinge arms 20 and 21 to this end can be provided with oblong openings 59 and 60 with which they are attached around the round axle 61, in such a way that these arms 20 and 24 are laterally movable in the hinging point 18, whereby the hinge arms are drawn towards each other by means of a spring 62 or similar.

It is clear that such play can also be provided in the case that the clamps 5 and 6 are turnable around separate hinging points.

The present invention is not at all limited to the embodiment described as example and shown in the figures, but such bicycle pedal can be realized in a multitude of forms without leaving the scope of the invention.

I claim:

1. A bicycle pedal comprising:

a pedal axle;

a foot rest connected to and supported upon said pedal axle; and means for holding a shoe on said bicycle pedal, said holding means including at least two clamps which are pivotally attached to said foot rest, each of said at least two clamps including a first portion located below and arranged Substantially parallel to said foot rest and a hooking element that extends about a respective lateral side of said foot rest for directly engaging the shoe, said holding means being movable, from a closed position, laterally outwardly relative to said foot rest upon the exertion of a predetermined level of force thereon created by lateral movement of the shoe retained on said bicycle pedal by said holding means.

2. The bicycle pedal according to claim 1, wherein said at least two clamps are arranged and movable in parallel planes with respect to each other.

3. The bicycle pedal according to claim 1, wherein said at least two clamps are arranged in an open V-shaped configuration.

4. The bicycle pedal according to claim 1, wherein one of said at least two clamps is positioned closer to said pedal axle than another of said at least two clamps and said bicycle pedal further comprises stop means for limiting the movement of said one of said at least two clamps toward said pedal axle.

5. The bicycle pedal according to claim 1, further comprising elastic means for biasing said holding means into said closed position.

6. The bicycle pedal according to claim 5, wherein said elastic means comprises at least one wire spring.

7. The bicycle pedal according to claim 5, wherein said foot rest includes a support plate and said at least two clamps are pivotable about a common pivot axle which is fixed to said support plate.

8. The bicycle pedal according to claim 7, wherein each of said at least two clamps includes a free end and said elastic means acts on the free ends of each of said at least two clamps and biases said free ends toward each other.

9. The bicycle pedal according to claim 1, further comprising resistance means operatively associated with at least one of said at least two clamps for providing an initial, predetermined supplementary force that must be overcome in order to shift said at least one clamp out of said closed position.

10. The bicycle pedal according to claim 9, wherein said resistance means comprises an element that is biased in a first direction by a spring but which can be shifted in an opposite direction by movement of said at least one clamp.

11. The bicycle pedal according to claim 9, further including means for adjusting the predetermined supplementary force associated with the resistance means.

12. The bicycle pedal according to claim 11, wherein said at least one clamp is positioned further from said pedal axle than another of said at least two clamps.

13. The bicycle pedal according to claim 1, further including hinge means for pivotally attaching said at least two clamps to said foot rest.

14. The bicycle pedal according to claim 13, wherein said hinge means defines a single hinge point.

15. The bicycle pedal according to claim 13, wherein said hinge means includes a cylindrical pin secured to said foot rest and said at least two clamps include laterally extending arms having terminal ends, the terminal ends of said arms being formed with oblong openings which extend about said cylindrical pin.

16. The bicycle pedal according to claim 15, wherein said oblong openings have associated longitudinal axes that are arranged crosswise with respect to a longitudinal axis associated with said bicycle pedal.

17. The bicycle pedal according to claim 15, further comprising a spring acting on the terminal ends of the arms of said at least two clamps for biasing said at least two clamps two toward each other.

\* \* \* \* \*